(12) United States Patent
Recker (10) Patent No.: US 7,712,293 B1
(45) Date of Patent: May 11, 2010

(54) ACCESSORY MOUNT ARRANGEMENT FOR A LAWN VEHICLE

(76) Inventor: Scott J. Recker, 11009 Songbird Dr., Peosta, IA (US) 52068

(*) Notice: Subject to any disclaimer, the term of this patent is extended or adjusted under 35 U.S.C. 154(b) by 0 days.

(21) Appl. No.: 12/420,550

(22) Filed: Apr. 8, 2009

(51) Int. Cl.
*A01D 34/00* (2006.01)

(52) U.S. Cl. .......................... 56/14.9; 56/12.7; 56/13.7

(58) Field of Classification Search .............. 56/14.9, 56/12.7, 13.7, 16.9, 14.7, 15.3, 15.9, DIG. 9; 172/13; 144/335, 336, 24.12, 34.1; 37/268, 37/40, 443
See application file for complete search history.

(56) References Cited

U.S. PATENT DOCUMENTS

| | | | |
|---|---|---|---|
| 1,710,749 A | 4/1929 | Svendsgaard | |
| 1,816,246 A | 7/1931 | Herman | |
| 2,455,840 A | 12/1948 | Stewart | |
| 2,457,511 A | 12/1948 | Ware | |
| 2,603,249 A | 7/1952 | Lawrence | |
| 2,618,918 A | 11/1952 | Hansen | |
| 2,725,740 A | 12/1955 | Skromme | |
| 2,729,044 A | 1/1956 | Dunn et al. | |
| 2,732,675 A | 1/1956 | Smith et al. | |
| 3,115,739 A | 12/1963 | Thoen et al | |
| 3,221,482 A | 12/1965 | Cowling | |
| 3,236,037 A | 2/1966 | Porterfield | |
| 3,274,762 A | 9/1966 | Jolis | |
| 3,526,083 A | 9/1970 | Barry et al. | |
| 3,824,772 A | 7/1974 | Sorenson et al. | |
| 4,048,789 A | 9/1977 | Cartner | |
| 4,170,099 A | 10/1979 | Owens | |
| 4,183,195 A | 1/1980 | James | |
| 4,206,580 A | 6/1980 | Truax et al. | |
| 4,366,877 A | 1/1983 | Vissers et al. | |
| 4,506,464 A | 3/1985 | Cartner | |
| 4,629,006 A | 12/1986 | Mullet et al. | |
| 4,642,976 A | 2/1987 | Owens | |
| 4,663,920 A | 5/1987 | Skovhoj | |
| 4,718,221 A | 1/1988 | Wessel et al. | |
| 4,887,417 A | 12/1989 | Parsons, Jr. | |
| 4,896,488 A | 1/1990 | Duncan et al. | |
| 4,949,534 A * | 8/1990 | Evans | 56/6 |
| 4,949,536 A * | 8/1990 | Neufeld | 56/13.7 |
| 4,953,625 A | 9/1990 | Hurworth | |
| 4,956,965 A * | 9/1990 | Parsons, Jr. | 56/15.1 |
| 5,146,737 A | 9/1992 | Gantzer | |
| 5,167,108 A | 12/1992 | Bird | |
| 5,226,284 A | 7/1993 | Meehleder | |
| 5,303,532 A * | 4/1994 | Phillips | 56/12.7 |

(Continued)

*Primary Examiner*—Árpád Fábián-Kovács
(74) *Attorney, Agent, or Firm*—Boyle Fredrickson, S.C.

(57) ABSTRACT

The present invention is related to lawn maintenance and describes a system for mounting an accessory, such as a grass trimmer, to a lawn tractor or lawn mower. The mounting system provides a lawn tractor operator the ability to operate an accessory while seated in the lawn tractor. The mounting system is also advantageous in that the operator need not specifically align the tractor with any objects that present an obstacle for mowing, but may instead move the accessory to the object. The accessory mounting system includes a linkage arrangement that allows the accessory to be moved from side-to-side of the lawn tractor. The linkage arrangement includes a centered orientated vertical pivot member interconnected with a link member, which is defined by a pair of curvilinear members, that allows the link member to rotate to reposition the accessory. The linkage arrangement also allows limited vertical displacement of the accessory.

22 Claims, 9 Drawing Sheets

U.S. PATENT DOCUMENTS

| | | | |
|---|---|---|---|
| 5,312,043 A * | 5/1994 | Whitney | 239/754 |
| 5,561,969 A * | 10/1996 | Sandy | 56/13.6 |
| 5,598,689 A | 2/1997 | Bork | |
| 5,694,752 A | 12/1997 | Warfield, III | |
| 5,725,230 A | 3/1998 | Walkup | |
| 5,802,824 A | 9/1998 | Aldrich | |
| 5,809,758 A | 9/1998 | Flanigan et al. | |
| 5,960,614 A | 10/1999 | Jones | |
| 6,032,443 A * | 3/2000 | Aldrich | 56/13.7 |
| 6,094,896 A | 8/2000 | Lane | |
| 6,098,719 A | 8/2000 | Turner | |
| 6,105,354 A | 8/2000 | Luhn et al. | |
| 6,343,461 B1 | 2/2002 | Knott | |
| 6,397,572 B1 | 6/2002 | Roundy et al. | |
| 6,415,585 B2 * | 7/2002 | Morabit et al. | 56/12.7 |
| 6,434,920 B1 | 8/2002 | Keane | |
| 6,457,301 B1 | 10/2002 | Buss | |
| 6,474,053 B1 | 11/2002 | Lund | |
| 6,487,838 B2 | 12/2002 | Handlin | |
| 6,516,597 B1 | 2/2003 | Samejima et al. | |
| 6,684,614 B2 * | 2/2004 | Greenwell | 56/11.7 |
| 6,966,168 B1 * | 11/2005 | Kerr, Sr. | 56/12.7 |
| 6,986,238 B1 * | 1/2006 | Bloodworth | 56/12.7 |
| 7,028,455 B1 * | 4/2006 | Liguras | 56/13.6 |
| 7,059,107 B2 * | 6/2006 | Pulvirenti | 56/13.7 |
| 7,219,488 B2 * | 5/2007 | Hatfield | 56/13.6 |
| 7,398,637 B1 * | 7/2008 | Sevey | 56/14.9 |

* cited by examiner

FIG. 11 ated of carrying out the invention.
ACCESSORY MOUNT ARRANGEMENT FOR A LAWN VEHICLE

BACKGROUND AND SUMMARY OF THE INVENTION

The present invention relates generally to lawn equipment and, more particularly, to a mounting arrangement for mounting an accessory, such as a grass trimmer, to a lawn vehicle, such as a lawn tractor.

One of the principal advantages of lawn tractors, especially those with a cutting deck, in the field of lawn maintenance is the time savings provided by the larger cutting deck when compared to conventional walk-behind mowers. In addition, a lawn tractor can typically traverse a lawn at a quicker pace than a person can push a walk-behind mower. Notwithstanding the aforementioned time-savings, frequently additional lawn tools are needed to complete the lawn maintenance thereby requiring the mower operator to make multiple trips around the lawn after having mowed it which effectively adds to the time needed to complete the lawn maintenance.

As such, it has been proposed to combine a lawn mower with other accessories to prevent the mower operator from having to make multiple trips around the lawn after having mowed it. However, the prior art shows that attempts to mount accessories such as grass trimmers, edgers, and so forth to the mower have been insufficient in some respects. For the most part, where simple accessory mounting systems are suggested, the accessory is relatively rigidly mounted to the mower so that the mower operator is required to position the mower in order to position the accessory. Where the accessory is mounted in such a way as to grant a wider range of movement, the accessory mounting system often is mechanically complex and therefore susceptible to damage and expensive repairs. What is needed therefore is an accessory mounting system that is simple, durable, and relatively inexpensive to manufacture and maintain, but that also provides the mower operator with a wide range of accessory positioning options that are relatively independent of the mower position. It would also be desirous to provide an accessory mounting arrangement that allows a mower operator to position the accessory at various desired positions without requiring the mower operator to vacate the seat of the mower. This is particularly advantageous for lawn mowers that have an automatic shutoff that is activated when the mower operator unseats from the seat of the lawn mower.

The present invention contemplates a mounting arrangement for mounting an accessory, such as a grass trimmer, to a lawn vehicle such as a lawn tractor or lawn mower, e.g., zero-turn lawn mower. The mounting arrangement is designed to be mounted to a rear portion of the lawn vehicle and through a series of vertical pivot members allow an operator to swivel the accessory to both sides of the law vehicle as desired without vacating the lawn vehicle. The mounting arrangement also allows the accessory to be positioned independently of the position of the lawn vehicle.

It is thus on object of the invention to provide an accessory mounting arrangement that allows an accessory, such as a grass trimmer, to be mounted to a lawn tractor or other lawn equipment in a manner that allows an operator to quickly access and use the accessory.

Therefore, in accordance with one aspect of the invention, a system for mounting an accessory to a vehicle is provided. The system includes a bracket adapted to be mounted to a rear portion of the vehicle and a linkage arrangement adapted to be interconnected to the bracket. The linkage arrangement includes a first member coupled to the bracket via a swivel connection that allows the first member to swivel relative to the bracket and a second member coupled to the first member in a manner that allows the second member to rotate relative to the first member. An accessory is interconnected with the second member so as to be suspended from the ground and supported solely by the linkage arrangement. The aforementioned swivel connection permits repositioning of the accessory between a first position adjacent the vehicle and a second position adjacent the vehicle opposite the first position.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
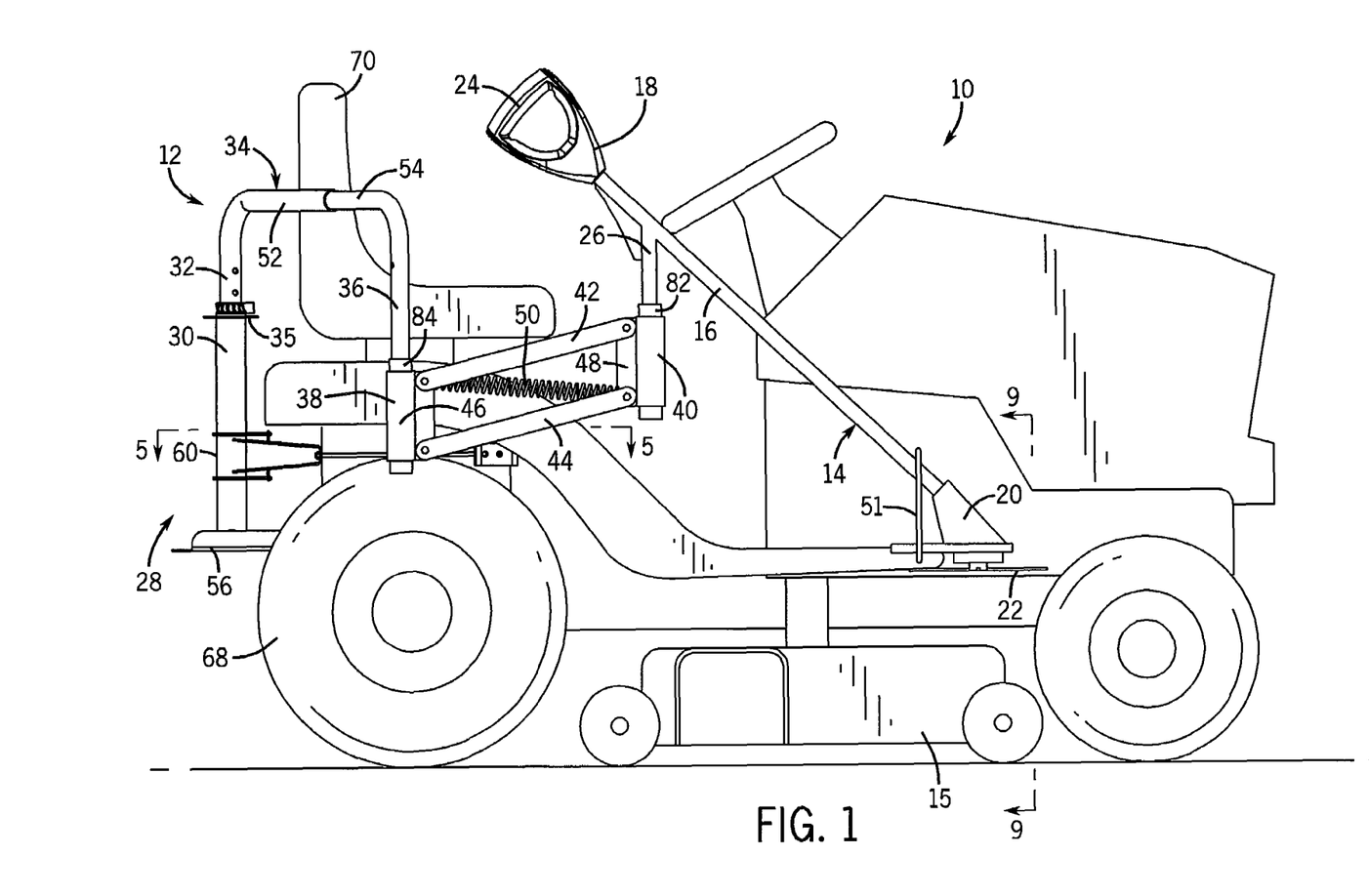
FIG. 1 is an elevation view of a lawn tractor with a grass trimmer movably mounted to the lawn tractor with an accessory mounting arrangement according to one embodiment of the present invention.
Figure 2:
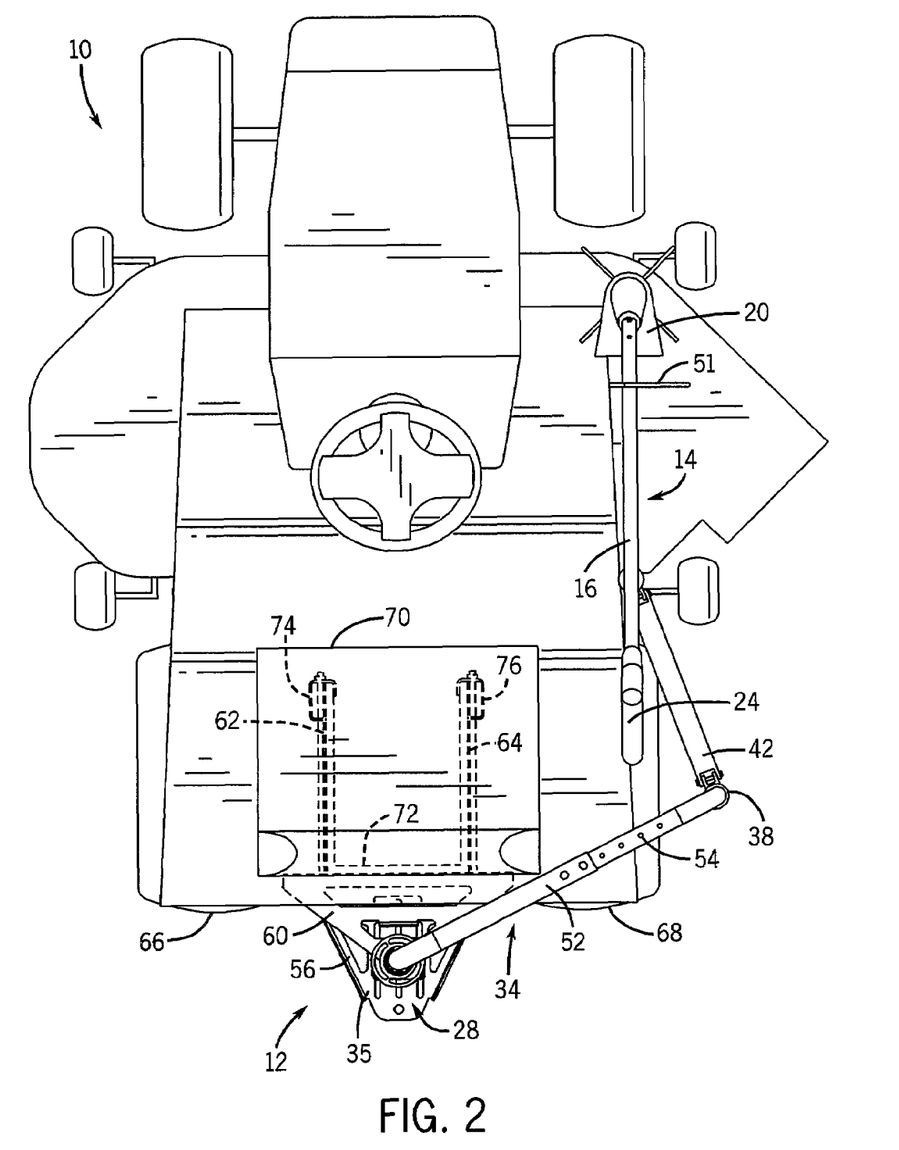
FIG. 2 is a top view of the lawn tractor and grass trimmer of FIG. 1 with the grass trimmer at a raised stowed position.

As can be seen in FIGS. 1 and 2, in a first embodiment of the invention, an accessory 14 is attached to a lawn tractor 10 through a mounting system that includes a linkage 12. Linkage 12 enables movement of accessory 14 in both vertical and horizontal directions. In the illustrated embodiment, lawn tractor 10 is a conventional riding lawn tractor, having a cutting deck 15, and accessory 14 is a line trimmer. However, accessory 14 could be any conventional lawn care tool that may be mounted to lawn tractor 10. Further, lawn tractor 10 need not be a riding tractor or mower, but could be replaced with a push-type or walk-behind lawnmower.

Figure 4:
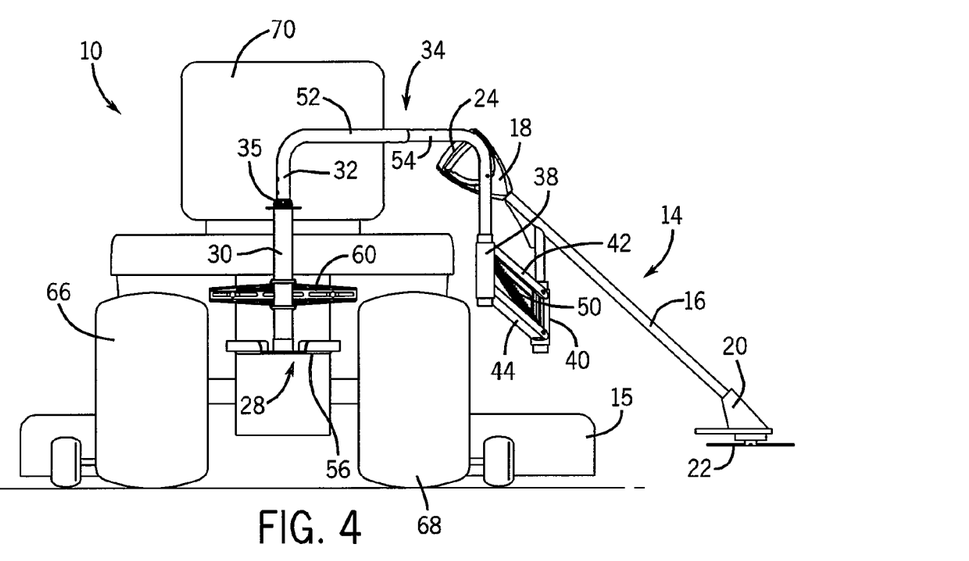
FIG. 4 is a rear end view of the lawn tractor and grass trimmer of FIG. 1 with the grass trimmer at a lowered working position.
Figure 9:
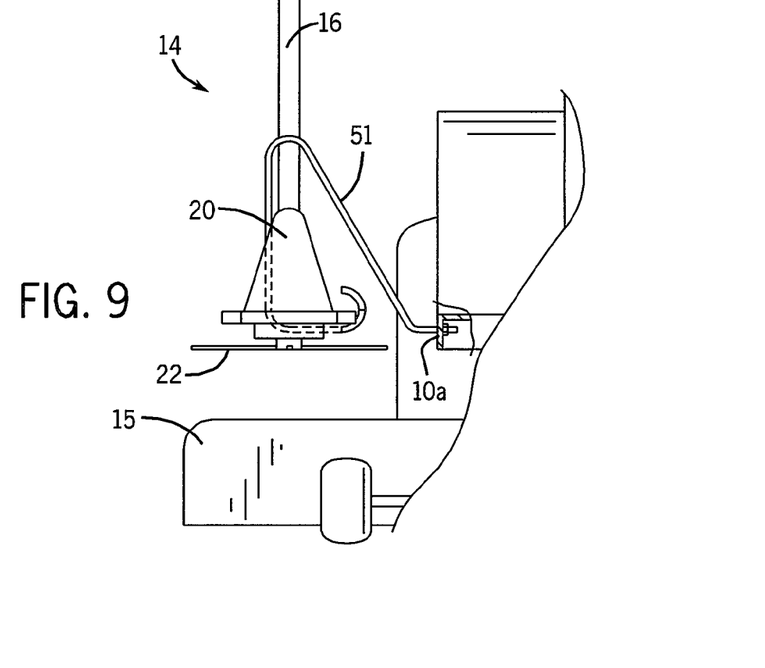
FIG. 9 is a section view of the lawn tractor and accessory mounting arrangement of FIG. 1 taken along line 9-9 of FIG. 1.

The trimmer accessory 14 has a shaft 16 that extends between a handle 18 and a trimmer head 20 that carries a trim line 22 in a known manner. Handle 18 includes a handgrip 24 at its upper end, and further includes an ON/OFF switch (not shown) for controlling operation of the trimmer head 20. The shaft 16 extends between the handle 18 and the trimmer head 20, in one embodiment, at a generally 45 degree angle. An upright mounting portion 26 extends downwardly from shaft 16 and couples the accessory 14 to the accessory mounting arrangement 12. The accessory mounting arrangement 12 generally includes a mounting assembly 28 to which a mounting post 30 is connected and adapted to receive an outer end 32 of an inverted U-shaped link member 34 via vertical pivot member 35. An inner end 36 of the link member 34 is received by a vertical pivot member 38 that is connected to vertical pivot member 40 by a pair of horizontal link members 42, 44. The horizontal link members 42, 44 are secured to the vertical pivot members 38, 40 by mounting plates 46, 48, respectively. A biasing spring 50 also extends between the mounting plates 46, 48. The horizontal link members 42, 44 are pivotably connected to the mounting plates thereby allowing the grass trimmer 14 to be lowered from the stowed raised position shown in FIGS. 1 and 2 to a lowered working position as shown in FIG. 4. The bias of the spring 50 must be overcome to lower the grass trimmer 14. In this regard, the spring 50 is designed to hold the grass trimmer 14 in the raised stowed position. Referring briefly to FIG. 9, a hanger 51 is mounted to the side 10a of the lawn tractor 10 and is designed to hold the grass trimmer in the stowed position.

Figure 3:
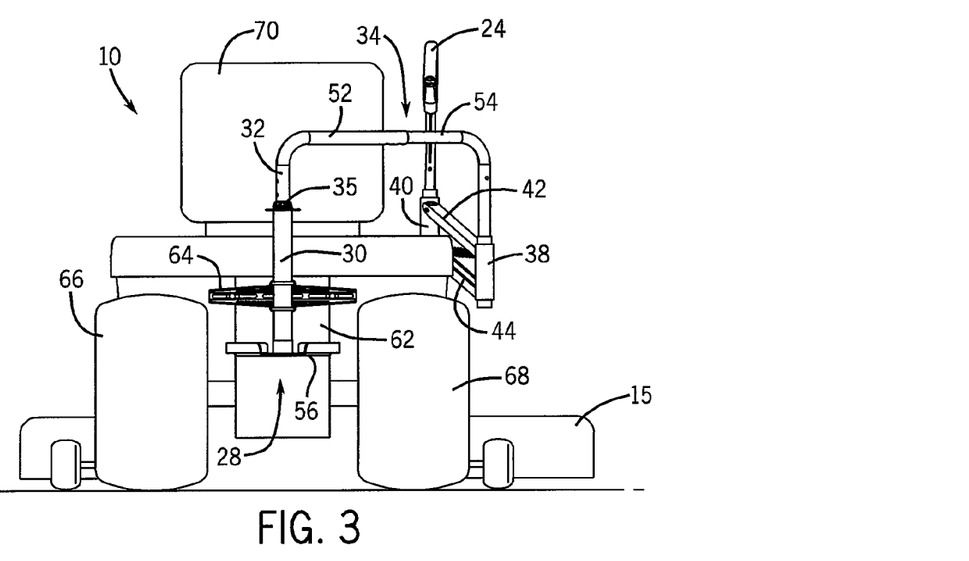
FIG. 3 is a rear end view of the lawn tractor and grass trimmer of FIG. 1 with the grass trimmer at the raised stowed position.
Figure 5:
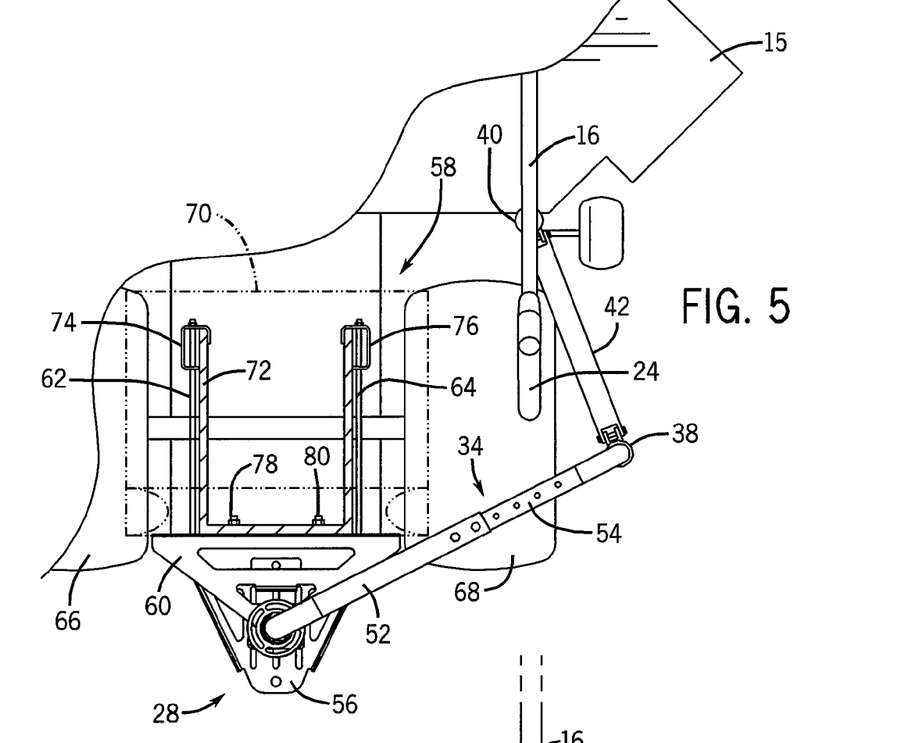
FIG. 5 is a section view of the lawn tractor and accessory mounting arrangement of FIG. 1 taken along line 5-5 of FIG. 1.

In one preferred embodiment, the inverted U-shaped link member 34 consists of two interlocking curvilinear members 52, 54. The interconnection between the link members 52, 54 can be adjusted to vary the distance of the vertical pivot member 38 from vertical pivot member 35. With additional reference to FIGS. 3 through 5, the mounting assembly 28 includes a mounting plate 56 from which mounting post 30 upwardly extends. The mounting plate 56 is attached to a rear portion of the lawn tractor, e.g., the lawn tractor chassis 58. In a preferred embodiment, the mounting post 30 extends through a stabilizer plate 60 that is also attached to the rear portion 62 of the lawn tractor 10 by stabilizer arms 62, 64. The mounting post 30 is generally centered on the chassis 58, which centers the mounting post 30 relative to rear tires 66, 68 and seat 70. As further shown in FIG. 5, the chassis 58 includes a power block 72 to which the mounting arms 58, 60 are attached by respective fasteners 74, 76. The mounting plate 56 is also attached to the power block 72 by fasteners 78, 80.

FIG. 2 shows the grass trimmer 14 in a raised stowed position generally adjacent the lawn tractor 10. As noted above, the trimmer head 20 may be supported by hanger 51 when the trimmer 14 is stowed. To use the trimmer 14 so as to trim around a tree, shrub, or other work area (generally designated T in FIGS. 6 through 8), the handgrip 24 is grasped from the operator while seated on seat 70 and the trimmer 14 is lifted to disengage the trimmer head 20 from the hanger 51. To disengage the trimmer head 20 from the hanger 51, a lifting action on the trimmer 14 is needed. In this regard, the horizontal link members 42, 44 pivot upward about mounting plate 46. Once disengaged from the hanger 51, the trimmer 14 can be extended away from the lawn tractor 10 and the trimmer head 20 presented to a work area, e.g., tree T.

Figure 6:
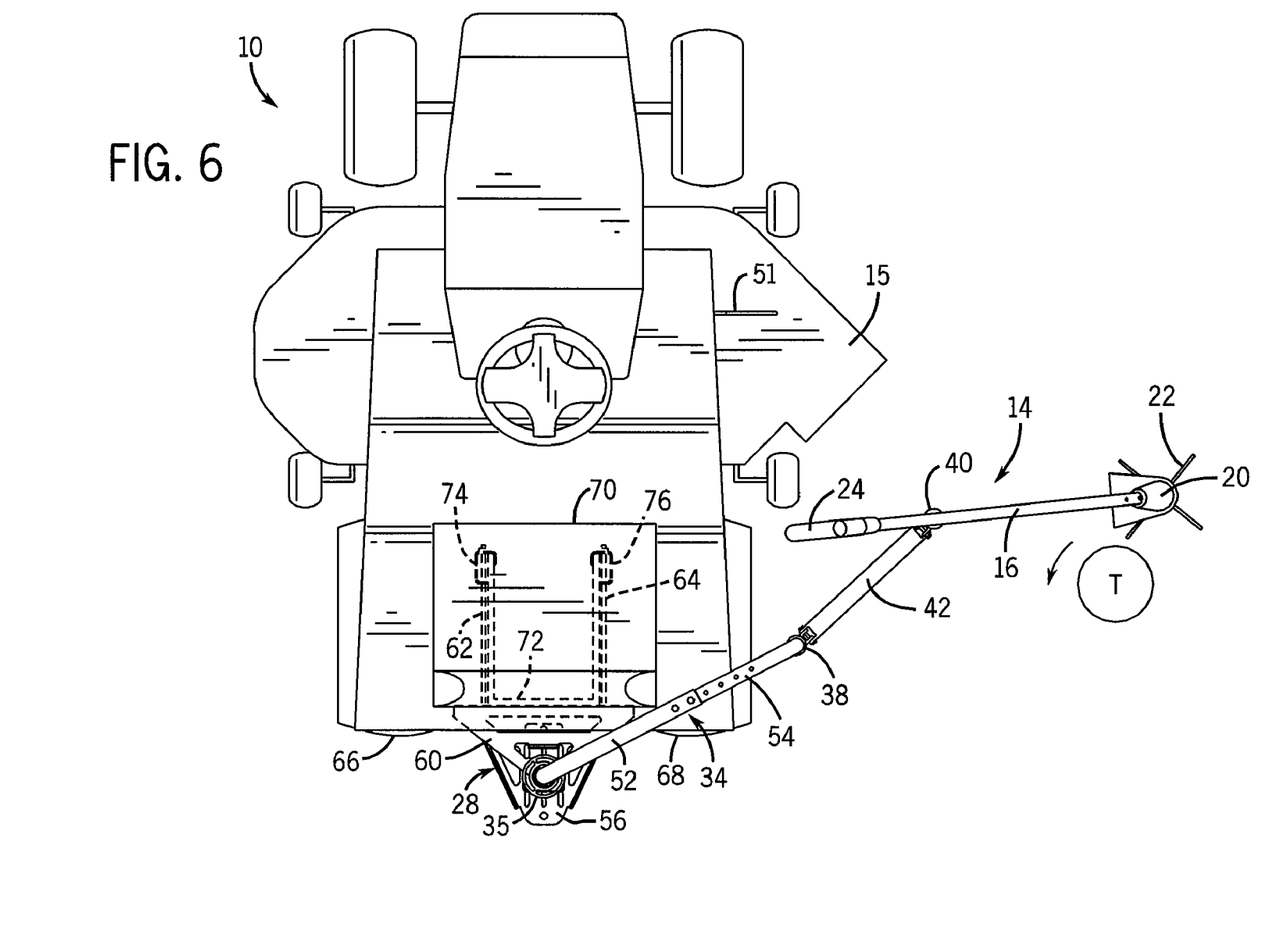
FIG. 6 is a top view of the lawn tractor and grass trimmer of FIG. 1 with the grass trimmer at a working position with a working end of the grass trimmer shown positioned adjacent a work area.
Figure 7:
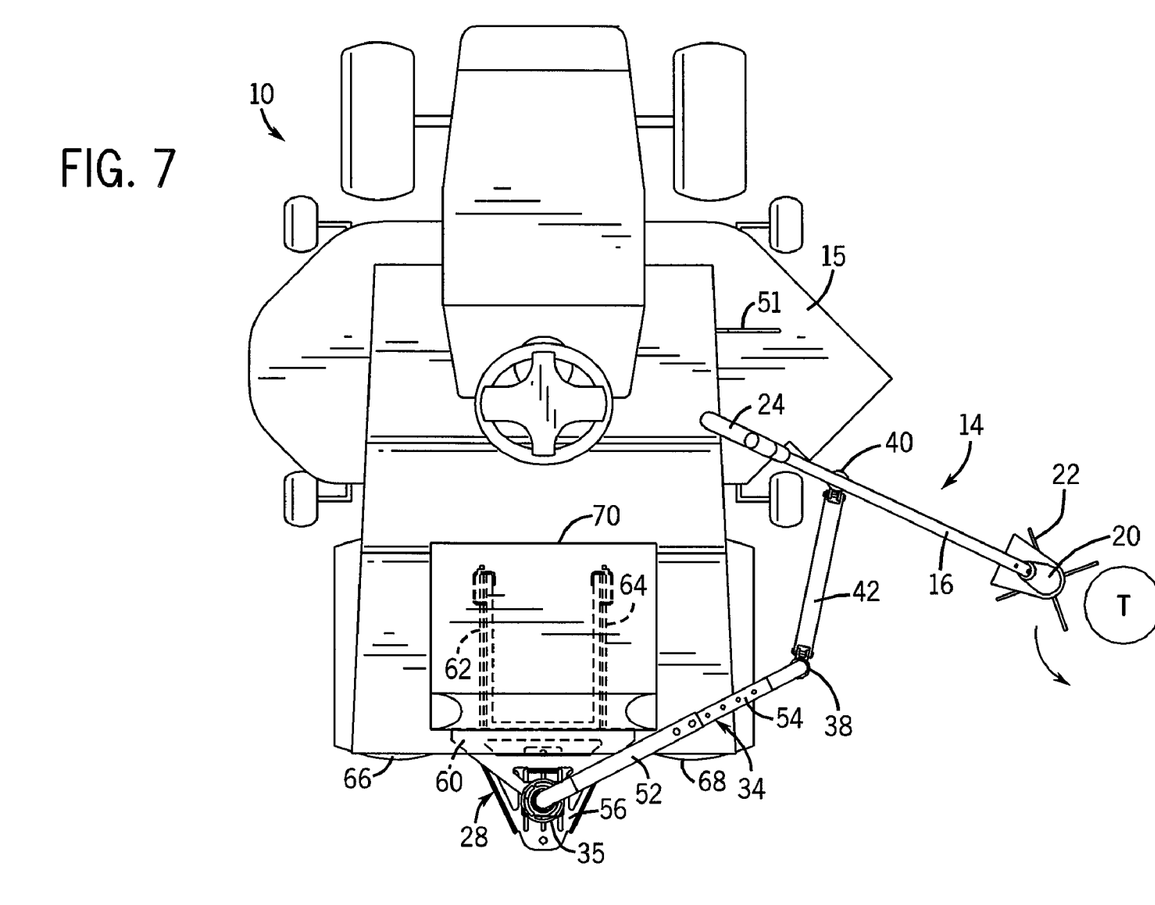
FIG. 7 is a top view of the lawn tractor and grass trimmer similar to that shown in FIG. 6 with the grass trimmer shown moved relative to the work area.
Figure 8:
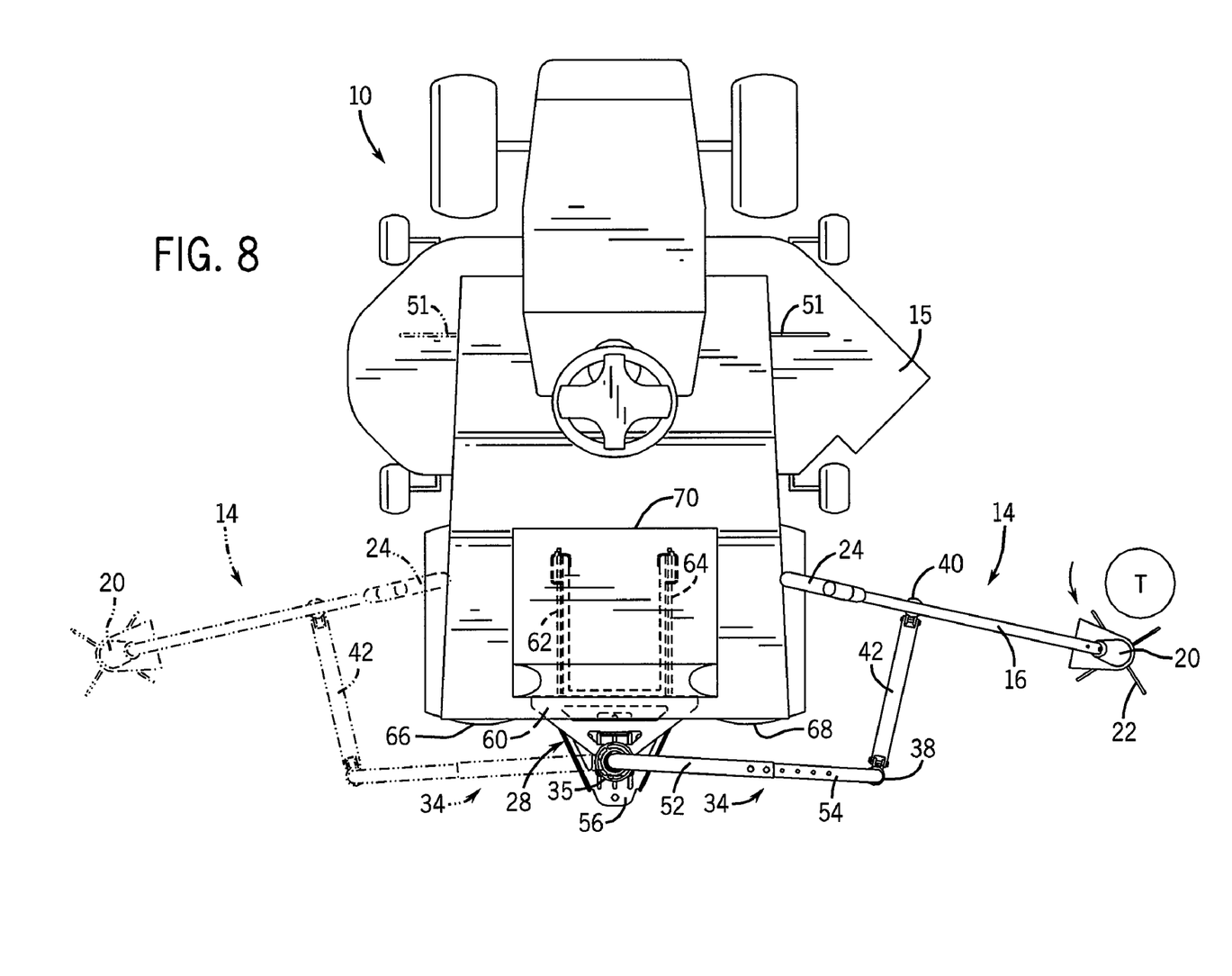
FIG. 8 is a top view of the lawn tractor and grass trimmer similar to that shown in FIG. 6 with the grass trimmer shown further moved relative to the work area.

The vertical pivot member 40 allows the trimmer 14 to be rotated relative to the horizontal link members 42, 44, as illustrated in the exemplary orientations of the shaft 16 of the trimmer 14 relative to link member 42 shown in FIGS. 6 through 8. Vertical pivot member 38 allows the horizontal link members 42, 44 to rotate relative to link member 34, as also illustrated in FIGS. 6 through 8. Vertical pivot member 35 similarly allows the link member 34 to rotate or swivel relative to mounting post 30. As illustrated in FIGS. 6 through 8, the aforementioned vertical pivot members allow the various link members to articulate relative to one another to allow the trimmer 14 to be moved to various positions without detaching the trimmer 14 from the accessory mounting arrangement 12. As noted above, the interconnection of the horizontal link members 42, 44 to mounting plates 46, 48 also allows the elevation of the trimmer 14, and thus the trimmer head 20, to be raised and lowered as desired. Further, the vertical pivot member 35 allows full rotation of the link member 34 about post 30. In this regard, the trimmer 14 can be moved from side-to-side of the lawn tractor 10 without requiring remounting of the trimmer 14 or the accessory mounting arrangement 12 or operator exit from the lawn tractor 10, as shown in FIG. 8 for example. It is noted, however, that in the illustrated embodiment, the seat 70 would interfere with complete 360 degree rotation of the link member 34 about post 30, but, in a preferred embodiment, the interconnection of the link member 34 and the post 30 itself does not limit the range of rotation. Referring briefly again to FIG. 1, the mounting member 26 of the trimmer 14 is received in a sleeve 82 that is in turn received by member 40. The interconnection of the sleeve 82 and the vertical pivot member 40 allows the sleeve 82 to rotate within the vertical pivot member 40. Similarly, the outer end 36 of the link member 34 is received by a sleeve 84 that is rotatably interconnected with vertical pivot member 38. And, similarly, the inner end 32 of the link member 34 interconnects with the vertical pivot member 35 that allows the link member 34 to rotate relative to the post 30.

Figure 10:
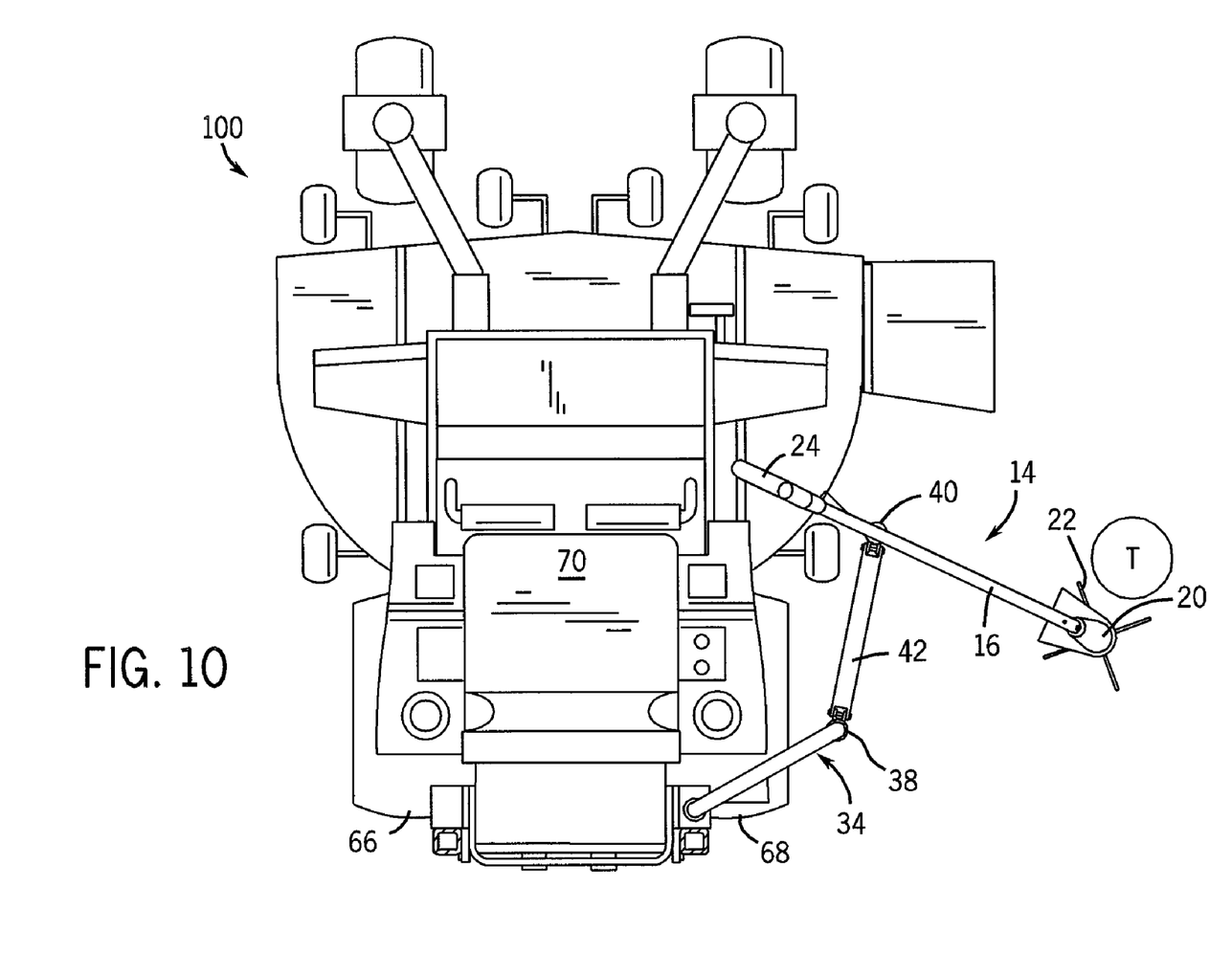
FIG. 10 is a top plan view of a zero-turn lawn mower with a grass trimmer movably mounted to the lawn tractor with an accessory mounting arrangement according to another embodiment of the present invention.
Figure 11:
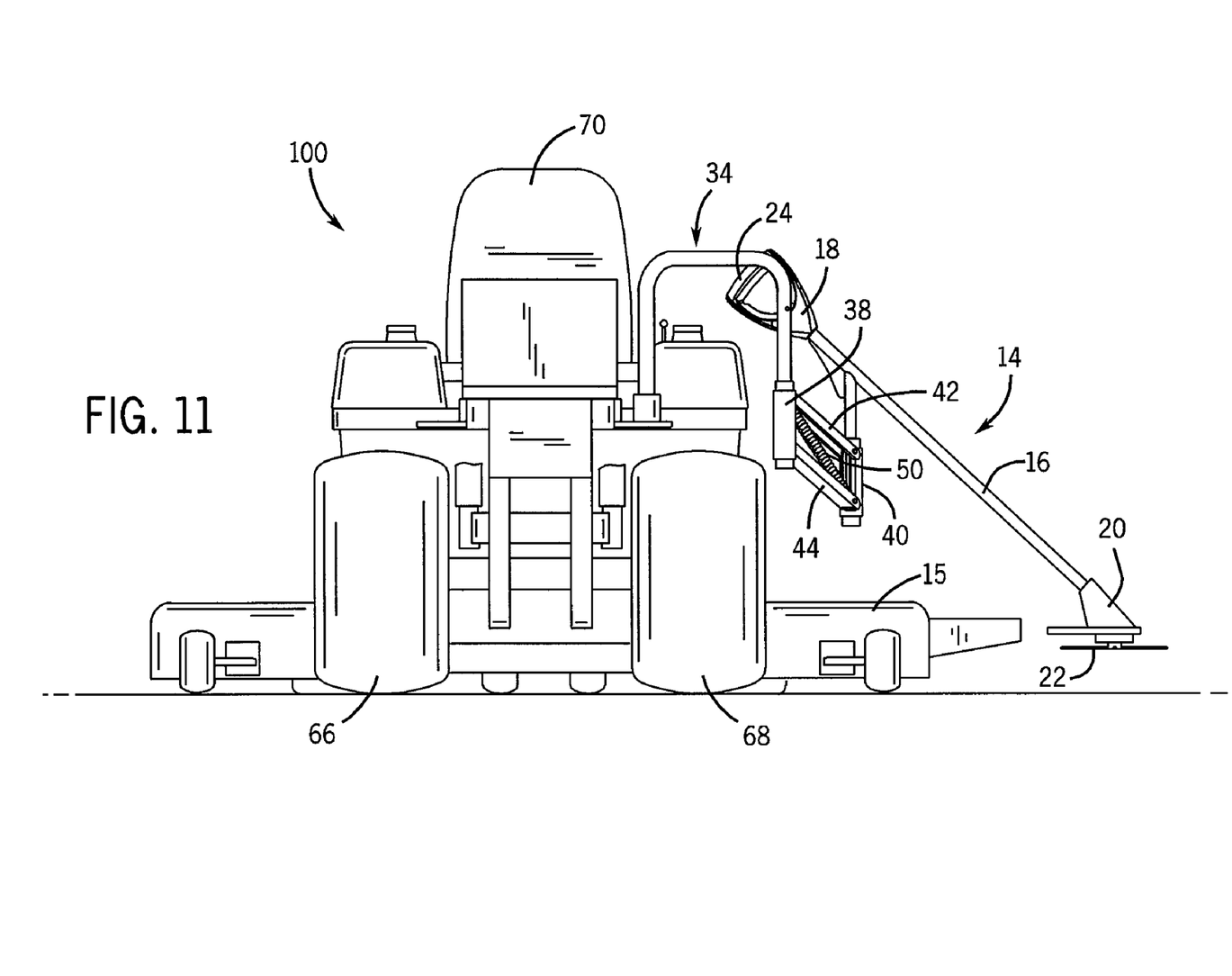
FIG. 11 is a rear elevation view of the lawn mower and grass trimmer of FIG. 10.

As shown in FIGS. 10-11, accessory mounting arrangement 12 may also be used to mount a trimmer accessory 14 to a zero-turn lawn mower 100. In the embodiment illustrated in FIGS. 10-11, the accessory mounting arrangement 12 is mounted to a side of the lawn mower 100 generally adjacent seat 70 rather than a rear-mounted position. It is recognized however that the accessory mounting arrangement 12 could be mounted to an opposite side of the lawn mower 100 or could be mounted rearward of the seat 70.

It is also noted that various members of the accessory mounting arrangement 12 are interconnected with pushbutton-type connections thereby allowing the accessory mounting arrangement to be detached from the lawn tractor in a tool-less manner.

Additionally, it is understood that different types of clamping arrangements different from those described and shown may be used to couple the accessory mounting arrangement 12 to the lawn tractor or mower.

Various alternatives and embodiments are contemplated as being within the scope of the following claims particularly pointing out and distinctly claiming the subject matter regarded as the invention.

I claim:

1. A system for mounting an accessory to a vehicle, comprising:
   a bracket adapted to be mounted to a rear portion of the vehicle;
   a linkage arrangement adapted to be interconnected to the bracket, wherein the linkage arrangement includes a first member coupled to the bracket in a swivel connection that allows the first member to swivel relative to the bracket and a second member coupled to the first member in a manner that allows the second member to rotate relative to the first member; and an accessory interconnected with the second member so as to be suspended from the ground and support solely by the linkage arrangement, wherein the accessory defines a working end spaced from a handle, and wherein the accessory is interconnected to the second member at a position between the working end and the handle; and wherein the swivel connection permits repositioning of the accessory between a first position adjacent the vehicle and a second position adjacent the vehicle and opposite the first position.

2. The system of claim 1 wherein the bracket is adapted to be center mounted to a rear portion of the vehicle.

3. The system of claim 1 further comprising a vertical pivoting member interconnected between the first member and the second member, wherein the vertical pivoting member allows the second member to pivot relative to the first member.

4. The system of claim 3 wherein the first member has an inverted U-shape having a first end coupled to the bracket at the swivel connection and a second end coupled to the vertical pivoting member at a first pivoting connection.

5. The system of claim 4 wherein the second member is coupled to the vertical pivoting member at a second pivoting connection spaced from the first pivoting connection.

6. The system of claim 1 further comprising a biasing arrangement interconnected between the linkage arrangement and the accessory, and configured to resiliently bias the accessory toward a raised position.

7. The system of claim 1 wherein the vehicle is a lawn tractor and the accessory is a trimmer.

8. The system of claim 1 wherein the vehicle is a zero-turn lawn mower.

9. A system for mounting an accessory to a vehicle, comprising:
  a linkage including a first link member and a second link member, each link member having inner ends and outer ends, the first link member generally having an inverted U shape;
  a first vertical pivot member mounted between the inner ends of the first and the second link members and configured to permit rotation of the second link member relative to the first link member about a first vertical axis;
  a linkage mounting arrangement interconnected with the vehicle;
  a second vertical pivot member mounted between the linkage mounting arrangement the outer end of the first link member, the second vertical pivot member permitting rotation of the first link member about a second vertical axis defined by the second vertical pivot member;
  an accessory mounting arrangement defining an inner end and an outer end to which the accessory is secured;
  a third vertical pivot member mounted between the inner end of the accessory mounting arrangement and the outer end of the second link member, and permitting rotation of the accessory mounting arrangement about a third vertical axis defined by the third vertical pivot member; and
  a manually operated handle interconnected with the accessory mounting arrangement and configured to be moved to pivot the accessory mounting arrangement about the third vertical axis.

10. The system of claim 9 wherein the second link member is interconnected to the second vertical pivot member by a horizontal pivot member that allows vertical movement of the second link member relative to the first link member.

11. The system of claim 10 further comprising a biasing member interconnected between the linkage mounting arrangement and the horizontal pivot member for resiliently biasing the accessory in a raised position.

12. The system of claim 11 wherein the biasing member is a spring extending between the horizontal pivot member and the third vertical pivot member.

13. The system of claim 9 wherein the first link member has a first linking element and a second linking element interconnected to the first linking element.

14. The system of claim 13 wherein the first linking element has an inner end with a series of openings formed therein and an outer end connected to the first vertical pivot member and the second linking element has an inner end with at least one pin configured to be selectably received in one of the openings of the outer end of the first linking element and an outer end connected to the second vertical pivot member.

15. The system of claim 14 wherein the first vertical pivot member allows full rotation of the linkage about the first vertical axis such that the accessory may be selectively positioned at either side of the vehicle.

16. The system of claim 15 wherein the first vertical pivot member is mounted to an end member of the vehicle such that the linkage may be rotated by a user seated on the vehicle to position the accessory to either side of the vehicle without requiring the user to exit the vehicle.

17. A lawn tractor comprising:
  a chassis supported by a set of wheels that travel along a ground surface and supporting an operator cab, the operator cab substantially centered between a left side adjacent the chassis and a right side adjacent the chassis;
  a cutting deck mounted beneath the chassis;
  an accessory rotatably mounted to a rear end of the chassis and movable to either the left side and the right side by a user positioned in the operator cab, wherein the accessory is mounted to the rear end by a linkage assembly that includes:
    a first curvilinear post rotatably mounted to the rear end of the chassis, the first curvilinear post having an inner end and an outer end opposite the inner end, and wherein the outer end is rotatably mounted to the rear end of the chassis;
    a second curvilinear post having an inner end and an outer end, the inner end adjustably connected to the outer end of the first curvilinear post; and
    an accessory mount interconnected between the accessory and the outer end of the second curvilinear post by a bi-directional pivoting member that allows vertical displacement and horizontal displacement of the accessory relative to the second curvilinear post.

18. The lawn tractor of claim 17 wherein the first curvilinear post and the second curvilinear post, when interconnected, form an inverted U-shaped link between the rear end of the chassis and the bi-directional pivoting member.

19. The lawn tractor of claim 17 wherein the linkage assembly includes a bracket interconnected to the rear end of the chassis and the first curvilinear post.

20. The lawn tractor of claim 17 wherein the linkage assembly includes a biasing member that biases the accessory in a raised position.

21. The lawn tractor of claim 20 wherein the accessory is suspended above the ground surface solely by the linkage assembly.

22. The lawn tractor of claim 17 wherein the accessory is a trimmer.

* * * * *